US012749417B2

United States Patent
Estrada

(10) Patent No.: US 12,749,417 B2
(45) Date of Patent: Sep. 29, 2026

(54) ART DISPLAY APPARATUS

(71) Applicant: Erick Estrada, East Boston, MA (US)

(72) Inventor: Erick Estrada, East Boston, MA (US)

( * ) Notice: Subject to any disclaimer, the term of this patent is extended or adjusted under 35 U.S.C. 154(b) by 30 days.

(21) Appl. No.: 18/961,061

(22) Filed: Nov. 26, 2024

(65) Prior Publication Data

US 2025/0182652 A1 Jun. 5, 2025

Related U.S. Application Data

(60) Provisional application No. 63/605,159, filed on Dec. 1, 2023.

(51) Int. Cl.
*G09F 7/22* (2006.01)
*G09F 7/18* (2006.01)

(52) U.S. Cl.
CPC ........ *G09F 7/22* (2013.01); *G09F 2007/1856* (2013.01)

(58) Field of Classification Search
CPC ........................... G09F 7/22; G09F 2007/1856
See application file for complete search history.

(56) References Cited

U.S. PATENT DOCUMENTS 3,200,958 A * 8/1965 Hudgeons, Sr. ........ A47F 7/024 211/169
3,412,868 A * 11/1968 Carter ........................ G09F 7/22 211/163
3,565,260 A * 2/1971 Stewart ................. A47F 7/0246 211/4
3,960,273 A * 6/1976 Weston ................. A47F 7/0246 211/40
4,066,168 A * 1/1978 O'Toole ................. B42D 17/00 211/4
4,270,290 A * 6/1981 Eckert ........................ G09F 7/22 40/535
6,394,291 B2 * 5/2002 Maier-Hunke ...... G09F 15/0087 211/48

* cited by examiner

*Primary Examiner* — Gary C Hoge
(74) *Attorney, Agent, or Firm* — Foley & Lardner LLP

(57) ABSTRACT

Described herein are systems and methods for providing an art display apparatus. The art display apparatus includes a frame having a base and a first panel coupled to the base. The base includes a first end, a second end, and a middle portion between the first end and the second end. The first end defines a plurality of holes. The art display apparatus includes a plurality of rails. Each rail has a proximal end and a distal end. The proximal end is received through one of the plurality of holes defined in the first end and pivotally coupled to the second end. Furthermore, each rail of the plurality of rails has an angle to form a supporting structure to support an item of artwork.

20 Claims, 7 Drawing Sheets

ART DISPLAY APPARATUS

CROSS-REFERENCE TO RELATED APPLICATIONS

This application claims the benefit of and priority to U.S. Provisional Application No. 63/605,159, filed Dec. 1, 2023, the entirety of which is incorporated by reference herein.

BACKGROUND

Paper forms, used by artists, writers, inventors, painters, and alike, often prove inadequate for capturing the essence of expansive artworks, such as canvases for various sizes of artwork. Art display apparatuses and other art display methods can provide sufficient support to display canvases. This challenge becomes particularly evident in museums and galleries, where artists not only want to showcase their preserved recorded progression but also to provide documented insight into the development of the artist's style on a grand scale.

SUMMARY

At least one aspect of the present disclosure is directed to an art display apparatus. The art display apparatus includes a frame having a base and a first panel coupled to the base. The base includes a first end, a second end, and a middle portion between the first end and the second end. The first end defines a plurality of holes. Additionally, the art display apparatus includes a plurality of rails. Each rail has a proximal end and a distal end. The proximal end is received through one of the plurality of holes defined within the first end and pivotally coupled to the second end. Furthermore, each rail of the plurality of rails has an angle to form a supporting structure to support an item of artwork.

In some implementations, the base further includes a first side and a second side. The first side is coupled to the first panel of the frame, and the second side is coupled to a second panel of the frame.

In some implementations, the first panel of the frame is coupled to the first side of the base via a hinge connection.

In some implementations, the first panel of the frame includes two sets of elongated legs. A first set of elongated legs extends vertically, and a second set of elongated legs extends horizontally. Each panel further includes at least two transverse crossbars. A first transverse crossbar connects the first set of elongated legs, extending vertically, and a second transverse crossbar connects the second set of elongated legs, extending horizontally. Furthermore, the transverse crossbars are positioned at the midpoints of the respective elongated legs.

In some implementations, each rail of the plurality of rails is parallel to an axis traversing the middle portion of the base between the first end and the second end.

In some implementations, a given rail of the plurality of rails includes a first rail member and a second rail member coupled with the first rail member by a pipe elbow forming the angle.

In some implementations, each rail of the plurality of rails has the angle of 30 to 90 degrees at a distance from the distal end.

In some implementations, the number of the plurality of rails is proportional to a size of the frame.

In some implementations, the art display apparatus may further include an actuator configured to direct movement of the first panel.

In some implementations, the art display apparatus may further include a remote control operatively coupled to the actuator to provide, responsive to a command input, a control signal to the actuator to control operation of the actuator responsive to the control signal.

In some implementations, the art display apparatus may further include an integrated lighting system for illuminating the item of artwork.

In some implementations, the art display apparatus may further include a protective cover removably attached to the frame.

At least one aspect of the present disclosure is directed to a method for assembling an art display apparatus. The method can include providing a frame having a base and a first panel coupled to the base. The base includes a first end, a second end, and a middle portion between the first end and the second end. The first end defines a plurality of holes. The base further includes a first side and a second side. Additionally, the method can include providing a plurality of rails. Each rail has a proximal end and a distal end. The proximal end is received through one of the plurality of holes defined within the first end and pivotally coupled to the second end. Furthermore, each rail of the plurality of rails has an angle to form a supporting structure to support an item of artwork.

The method can include providing that the first side of the base is coupled to the first panel of the frame and that the second side of the base is coupled to a second panel of the frame.

The method can include providing that the first panel of the frame is coupled to the first side of the base via a hinge connection. The first panel includes two sets of elongated legs. A first set of elongated legs extends vertically, and a second set of elongated legs extends horizontally.

The method can include providing at least two transverse crossbars. A first transverse crossbar connects the first set of elongated legs, extending vertically, and a second transverse crossbar connects the second set of elongated legs, extending horizontally. The transverse crossbars are positioned at the midpoints of the respective elongated legs.

The method can include providing each rail of the plurality of rails to be parallel to an axis traversing the middle portion of the base between the first end and the second end.

The method can include further providing a given rail of the plurality of rails comprising a first rail member and a second rail member coupled with the first rail member by a pipe elbow forming the angle.

The method can include further providing each rail of the plurality of rails having the angle of 30 to 90 degrees at a distance from the distal end.

The method can include further providing a number of the plurality of rails proportional to a size of the frame.

The method can include further providing an actuator configured to direct movement of the first panel.

The method can include further providing a remote control operatively coupled to the actuator to provide, responsive to a command input, a control signal to the actuator to control operation of the actuator responsive to the control signal.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form. As used in the specification and in the claims, the singular form of "a", "an", and "the" include plural referents unless the context clearly dictates otherwise.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Before turning to the figures, which illustrate the exemplary embodiments in detail, it should be understood that the present disclosure is not limited to the details or methodology set forth in the description or illustrated in the figures. It should also be understood that the terminology used herein is for the purpose of description only and should not be regarded as limiting.

While conventional art display apparatuses and methods may be adequate for displaying artworks, they often fail to provide the necessary support and security, especially for large artworks and/or for applications in which artwork may be modified, removed, replaced, etc. Art display apparatuses in accordance with the present disclosure can provide a secure and safe way to display various artworks. For example, an art display apparatus in accordance with the present disclosure can include a series of rails, each with a proximal end coupled to a base and a distal end with a bend at a certain distance from the distal end. This configuration provides a supportive structure that can accommodate a wide range of artwork sizes and configurations, unlike conventional art display apparatuses and methods.

For example, an art display apparatus can include a frame with a base. The base can include a first end and a second end, which can be opposite to each other within the frame, and a middle portion connecting the two ends. In some implementations, the base can include holes at the first end. The art display apparatus can further include multiple rails, each with a proximal end and a distal end. The rails can be inserted through the holes in the base and pivotally coupled to the second end. The rails can run parallel to a central axis traversing the middle portion of the base, and the rails can have an angle to form a supportive structure to hold the artwork securely. The base can be coupled to the frame's first and second panels. Each panel of the frame can include two sets of elongated legs, coupled by transverse crossbars positioned at the midpoints of the elongated legs.

Figure 1:
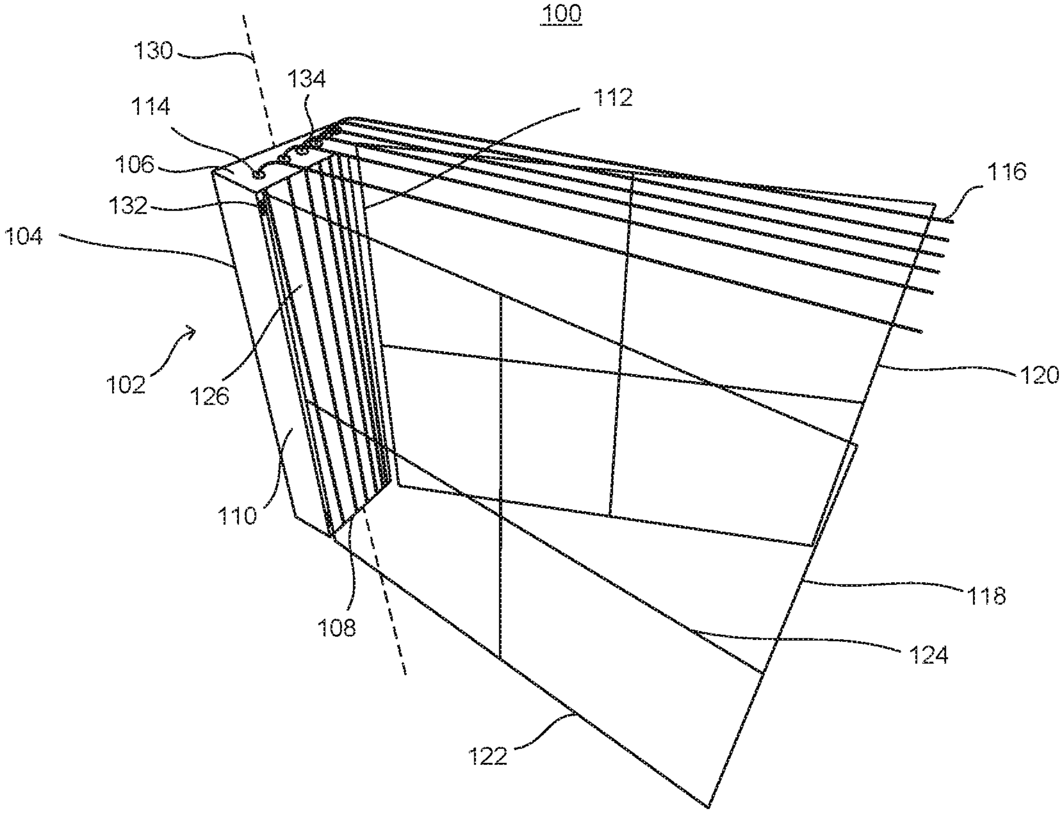
FIG. 1 illustrates a perspective view of an art display apparatus, according to an implementation.

Referring now to FIG. 1, an art display apparatus 100 is shown, according to an implementation. The art display apparatus 100 can include a frame 102. The frame 102 can be made of a variety of materials, including wood, metal, plastic, and more. The frame 102 can have a base 104 as its foundation. In some implementations, the base 104 can be oriented in a vertical orientation. The base 104 can be mounted to a wall and/or positioned on a floor or support. The base 104 can have, for example, a polygonal shape, such as a rectangular shape with a first end 106, a second end 108, a first side 110, and a second side 112. The first and second ends 106, 108 can be the shorter sides and opposite to each other within the frame 102. The first and second sides 110, 112 can be the longer sides and opposite to each other within the frame 102.

The first end 106 can define a plurality of holes 114. In some implementations, the first end 106 can define at least one hole 114. In some implementations, the plurality of holes 114 can be determined based on the size of the frame 102. For example, the larger the size of the frame 102, the more holes 114 there will be.

As shown, the frame 102 can include a first panel 118 and a second panel 120. The first panel 118 can be coupled to the first side 110 of the base 104 and the second panel 120 can be coupled to the second side 112 of the base 104. In some implementations, each panel 118, 120 can be coupled to the respective side 110, 112 of the base 104 via a coupling mechanism, such as a hinge connection 132 as depicted in FIG. 1, or a sliding joint. The hinge connection 132 can enable the panels 118, 120 to move open and close, which can give the frame 102 a book-like shape. In some implementations, the art display apparatus 100 may further include, but is not limited to, additional hinge connections 132.

In some implementations, the art display apparatus 100 can be used to support book-like shapes, which can include a wide range of forms, including, but not limited to, sketchbooks, black books, drawing pads, scratch pads, sketch pads, paint pads, books, magazines, pamphlets, hardcovers, journals, diaries, agendas, notebooks, ledgers, logs, comic books, brochures, bibles, booklets, albums, manuals, novels, textbooks, workbooks, design books, research books, drawing books, record books, history books, diagram books, schematics books, and canvas books. In some implementations, a sketchbook can be a notebook, a journal, a diary, and a tool for research and note-taking, among others.

Each panel 118, 120 can include one or more legs 122. The legs 122 can be elongated; for example, the legs 122 can have a length that is at least five times at least one of a height or a width (or other dimension, such as radius) of the legs 122. The legs 122 can have a length that is within fifty percent or within twenty-five percent of a height of the base 104, such as to provide a relatively square panel shape, or can have various other sizings.

In some implementations, the panel 118 and/or the panel 120 can include two or more sets of elongated legs 122. A first set of elongated legs 122 can extend vertically, and a second set of elongated legs 122 can extend horizontally. Additionally, each panel 118, 120 of the frame 102 can include one or more crossbars 124 that run perpendicular to the elongated legs 122. The number and placement of the crossbars 124 can be customized based on the specific size of the panels 118, 120. For example, in some implementations, one crossbar 124 can connect the first set of elongated legs 122, while another crossbar 124 can connect the second set of elongated legs 122. The crossbars 124 can be positioned at the midpoints of the respective elongated legs 122 to ensure an even distribution of weight and to provide stability. In some implementations, the crossbars 124 can be positioned at other points on the elongated legs 122 for adequate weight support.

In some implementations, the art display apparatus 100 can include at least one rail 116. In other implementations, the art display apparatus 100 can have a plurality of rails 116 connected to the base 104 as shown in FIG. 1. The rails 116 can be made from a range of materials, including, but not limited to, plastic, metal, polyvinyl chloride (PVC) pipe, or steel, among others. Each rail 116 can have a proximal end and a distal end. The proximal end can be inserted into one of the holes 114 in the first end 106 of the base 104 and pivotally coupled to the second end 108 of the base 104. This coupling mechanism (e.g., the rails 116 being received in the holes 114 with sufficient spacing from the walls of the first end 106 that form the holes 114 to allow for rotation of the rails 116) allows the rails 116 to pivot or rotate around the second opposing end 108, providing a secure attachment point. Each rail 116 can have a bend/angle 134 at a certain distance from the distal end, as shown in connection with FIG. 2, such as to position the bend/angle 134 relative to the corresponding hole 114.

Figure 2:
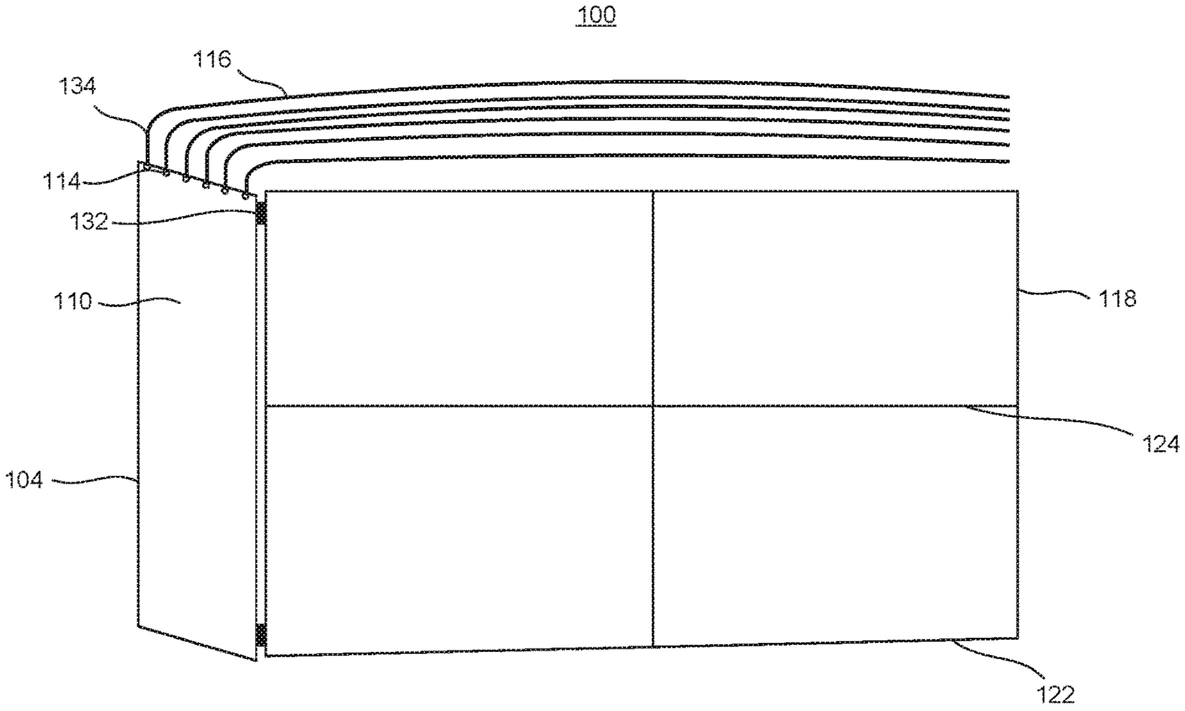
FIG. 2 illustrates a side view of the art display apparatus of FIG. 1, according to an implementation.

Referring now to FIG. 2, depicted is a side view of the art display apparatus 100 shown in FIG. 1, according to an implementation. As seen, the rails 116 can provide a supporting structure to support artworks of various sizes. In some implementations, the length of each rail 116, or the distance between the proximal and distal ends of the rail 116, can be customized to enable various display configurations. For example, short rails 116 can be used to create a more compact display, such as a tabletop display for displaying small works of art. In other implementations, long rails 116 can be used to create a spread-out display, such as a wall display for displaying larger works of art.

Additionally, the rails 116 can have a bend/angle 134 (e.g., an angled portion, where "bend" and "angle" can be used interchangeably) on the exterior side of the hole 114, extending away from the portion of the rail 116 that runs along the frame 102 between the first end 106 and the second end 108. The angle 134 can be set at a specific distance from the distal end of the rail 116 to facilitate a variety of display configurations. For example, the rails 116 can be bent/angled between 30 and 90 degrees to create a customized display, and the distance of the bend/angle 134 from the distal end of the rail 116 can vary, depending on the desired display configuration. In some implementations, the rails 116 can initially be built as straight rods, and when the rails 116 extend outward from the holes 114, the rails 116 can be manually bent/angled according to the desired configuration. In other implementations, the rails 116 may come pre-built with a predetermined bend 134, and their proximal ends can be coupled to the base 104, as described herein. In some implementations, the rails 116 may include steel pipe elbows (not shown) to connect the second opposing 108 of the base 104 to the rails 116 at the bend/angle 134. The proximal ends of the rails 116 can be inserted through the holes 114 in the first end 106 of the base 104, as shown in connection with FIG. 3.

Figure 3:
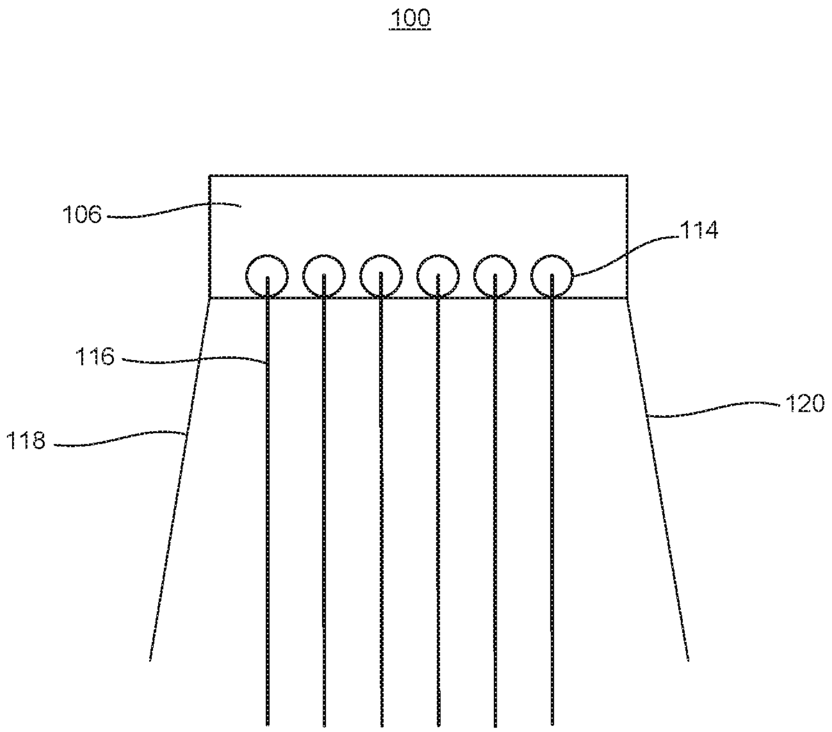
FIG. 3 illustrates a top view of the art display apparatus of FIG. 1, according to an implementation.

Referring now to FIG. 3, depicted is a top view of the art display apparatus 100 shown in FIG. 1, according to an implementation. The proximal ends of the rails 116 are received through the holes 114 positioned on the first end 106 of the base 104 between the first and second panels 118, 120 of the frame 102. In some implementations, the number of rails 116 can be equal to the number of holes 114. As seen, the holes 114 are circular openings that can be sized to allow the proximal ends of the rails 116 to be inserted snugly (e.g., to allow for rotatable coupling while providing at least some interference or friction to mitigate movement of the rails 116 relative to the base 104). Additionally, the holes 114 can be positioned in such a way that the rails 116 are evenly spaced and aligned.

Referring back to FIG. 1, the base 104 can include a central axis 130, which traverses through a middle portion 126 of the base 104, with the first and second ends 106, 108 of the base 104 located along the central axis 130. The rails 116 may include segments running from the bend 134 in the rail 116 to the proximal end coupled to the second end 108 of the base 104. The segments of the rails 116 are parallel to each other and can extend along the central axis 130.

In some implementations, the segments of the rails 116 can have a specific length from the bend/angle 134 of the rail 116 to the proximal end. This length can be the same for all rails 116 to distribute the load evenly across the rails 116 and reduce the risk of derailments. In other implementations, the length from the bend 134 to the proximal end of each rail 116 can vary or be adjusted differently for different implementations. The specific length of the segments will depend on several factors, including the weight of the canvas, the size of the frame 102, and the desired spacing between the rails 116, among others. The collective configuration of rails 116 can serve as a supporting structure, as shown in connection with FIG. 4.

Figure 4:
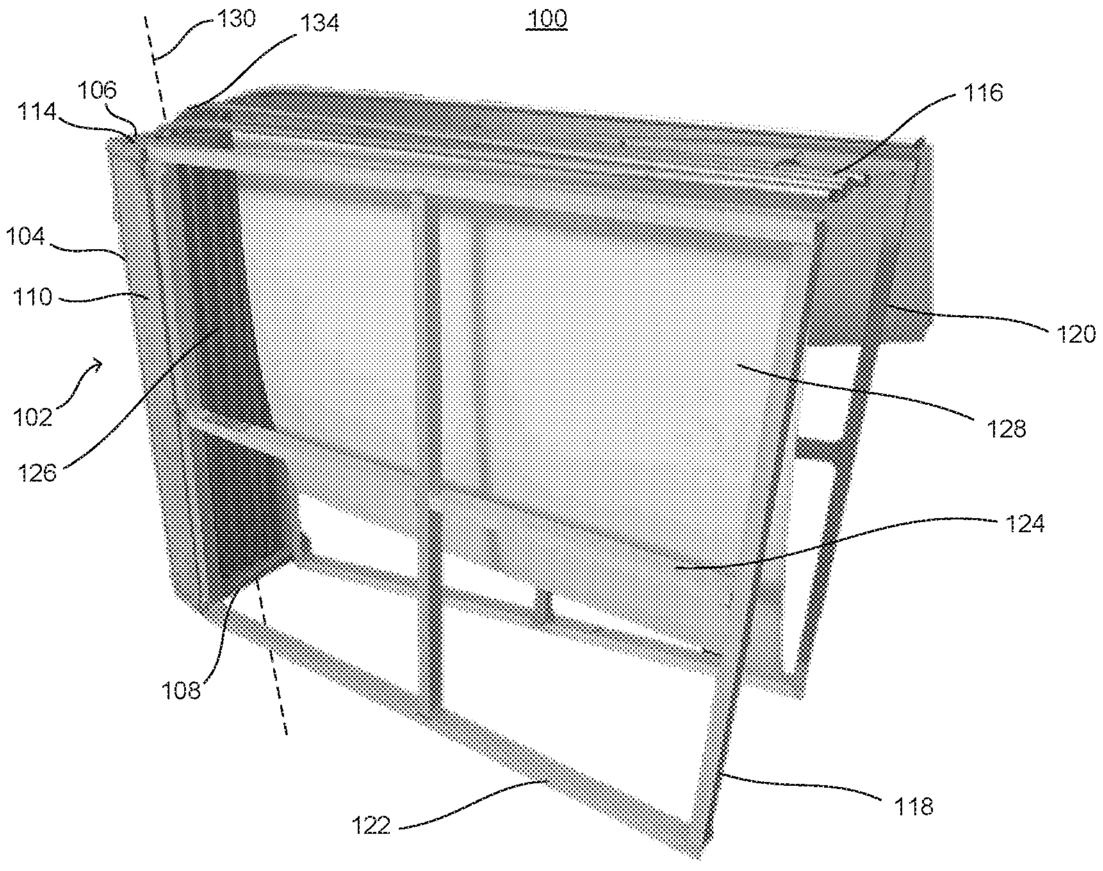
FIG. 4 illustrates a perspective view of the art display apparatus of FIG. 1 with a canvas, according to an implementation.

Referring now to FIG. 4, depicted is a perspective view of the art display apparatus 100 with a canvas secured by rails, according to an implementation. As described herein, the collective configuration of rails 116 can serve as a supporting structure for a canvas 128. The rails 116, as shown, can be arranged in a parallel configuration between the bend/angle 134 and the distal end. The rails 116 can provide a flat and/or even surface for the canvas 128 to be stretched over the rails 116, extending along the length of the legs 122. The canvas 128 can include various artistic materials, such as paintings, drawings, printed artwork, spray-paint, or other artistic media. The canvas 128 can be stretched across the rails 116 between the first panel 118 and the second panel 120 through a range of implementations. For example, in some implementations, clamps can be attached to the rails 116, and the canvas 128 can be stretched over the rails 116 and secured to the clamps. In other implementations, the canvas 128 can be secured to the rails 116 using adhesive, which can be applied to attach the canvas 128 to the rails 116. In addition to these methods, there can be several other methods to secure canvas 128 to rails 116. However, in some implementations, the rails 116 themselves can securely hold the canvas 128 in place, eliminating the need for clamps or adhesive. For example, the canvas 128 can be tightly stretched across the rails 116. The tension in the canvas 128, combined with the friction between the canvas 128 and the rails 116, can hold the canvas in place. In some embodiments, the rails 116 can have a specific shape or texture that helps to grip the canvas 128. For example, the rails 116 can have small grooves or ridges that the canvas 128 can fit into. In some embodiments, the materials used for the rails 116 and the canvas 128 can be selected to create a strong bond between the two. For example, the canvas 128 can be made of a material that adheres to the rails 116, or the rails 116 can be treated with a substance that improves their grip on the canvas 128.

The art display apparatus 100 can be available in a variety of sizes to accommodate a wide range of canvas sizes. For smaller canvases, the dimensions of the art display apparatus 100 can vary from approximately 12 to 13 inches in width and from 9 to 10 inches in height, making it suitable for displaying small paintings, drawings, and other types of artwork. For larger canvases, the dimensions of the art display apparatus 100 can vary from approximately 12 to 13 feet in width and from 9 to 10 feet in height, making it suitable for displaying large paintings, murals, and other types of artwork. In some implementations, the art display apparatus 100 can be equipped with wheels or casters to make it easier to move around. This can be useful for displaying artwork in galleries, museums, and other public spaces.

Figure 5:
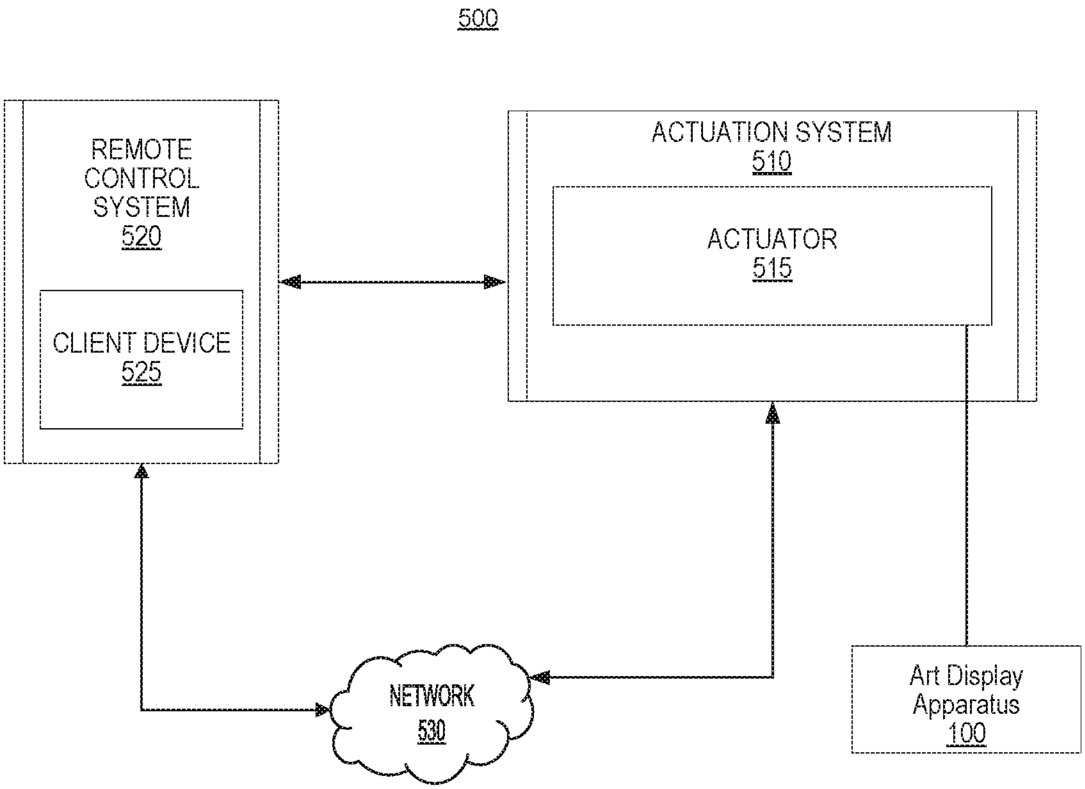
FIG. 5 illustrates a system that includes the art display apparatus of FIG. 1, according to an implementation.

FIG. 5 depicts an example of a display system 500. The display system 500 can incorporate features of various systems and apparatuses described herein, including, but not limited to, the art display apparatus 100. In some implementations, the art display apparatus 100 can include or be coupled with at least one actuator 515 to incorporate several features for page-turning convenience. For example, in some implementations, the art display apparatus 100 can include an actuation system 510 for turning pages. The actuation system 510 can include a series of cables connected to various points on the panels 118, 120 of the art display apparatus 100. The cables can be guided using a set of wheels or pulleys. The actuator 515 can generate the necessary movement, which is subsequently transferred through the cables. The wheels or pulleys, positioned around the edges or corners of the panels 118, 120 of the art display apparatus 100, can guide the cables in a controlled manner. As the actuator 515 activates, it pulls or releases the cables via the wheels or pulleys, causing the pages to turn or the panels 118, 120 to move.

In some implementations, the actuation system 510 can include various types of actuators, each configured to satisfy specific operational requirements. The actuators can range from mechanical or manually driven actuators, which rely on physical mechanisms or human intervention for movement, to more advanced types such as linear actuators and rotational actuators/motors, among others. Linear actuators provide movement in a straight line and are often used for precise control of the page-turning mechanism. The linear actuators can be powered by various means, including electric, hydraulic, or pneumatic systems. Rotational actuators or motors, on the other hand, provide rotational movement and can be used for applications where the pages or the art display apparatus 100 need to be turned or rotated around a fixed point or axis. The rotational actuators can be powered in various ways, including electric motors.

In some implementations, the actuator 515 can include communication electronics and/or user input interfaces essential for receiving and processing operational commands. In some implementations, the art display apparatus 100 can include a remote-control system 520, enabling users to operate page-turning from a distance. The remote-control system 520 can send a control signal to operate the actuator 515 in response to receiving a command input from a client device 525. The client device 525 can incorporate various forms depending on a user's preference. For example, the client device 525 can be a traditional handheld remote control specifically designed for operating the page-turning mechanism of the art display apparatus 100. In some implementations, the client device 525, which can be a mobile device such as a smartphone or tablet, runs applications that enable the user to send/transmit command inputs directly to the actuator 515 or to the remote-control system 520. When command inputs are sent to the remote-control system 520, the remote-control system 520 communicates with and controls the actuator 515 to perform the page-turning action. In some implementations, the remote-control system 520 and/or the mobile device can connect to the actuation system 510 using various connectivity options, including Wi-Fi, Bluetooth, or a network 530. As shown in FIG. 5, there can be direct control pathways, i.e., from the remote-control system 520 to the actuator 515, or networked control pathways, i.e., where commands are relayed through the network 530.

In some implementations, the remote system 520 can also be compatible with web applications. Users can use the web applications on various devices, including laptops and desktop computers, to remotely control the actuator 515. Additionally, the art display apparatus 100 may include motorized/robotic mechanisms, computerized systems, and multiple connectivity options, such as Bluetooth and/or Wi-Fi, enabling remote page-turning through various means, including, but not limited to, buttons, switches, mobile applications, or web applications.

In some implementations, the art display apparatus 100 may include an integrated lighting system to illuminate the artworks. The lighting system may include, but is not limited to, LED lights, fluorescent lights, or halogen lights, among others. The lighting system may be built into the base 104 of the art display apparatus 100, or it may be separate from the art display apparatus 100 but designed to integrate seamlessly with the art display apparatus 100. The lighting system can be powered in several ways, depending on the implementation. For example, in some implementations, the lighting system may be equipped with a built-in rechargeable battery. In some implementations, the lighting system may be connected to an external power supply.

In some implementations, the art display apparatus 100 may include or be coupled with one or more covers. The cover(s) can be positioned on one or more portions of the art display apparatus 100, such as to form protective layers and/or aesthetic elements for the art display apparatus 100. For example, the cover can include at least one of a protective layer or a frame cover (e.g., a cover on one or more legs 122 of the frame 102), such as to form a book jacket-type shape. The cover can be removably attached to the frame 102.

In some implementations, the cover can have one or more dimensions representative of a book cover width (e.g., to be similarly or identically sized to legs 122). In some implementations, the book cover may refer to a leg cover of the art display apparatus 100, which functions not only as structural supports but also defines the aesthetic profile of the art display apparatus 100. The leg cover, configured to match/correspond to the elongated proportions of the legs 122, can provide cohesive integration with the overall structure of the art display apparatus 100. In some implementations, the leg cover can be designed to accommodate a wide range of configurations, each distinctly influencing the "book-like" shape of the art display apparatus 100. For example, a leg cover designed with a "giant sketch pad" theme can serve as a protective and supportive element and transform the entire appearance of the art display apparatus 100 to align with the artistic utility suggested by the design. This adaptability in design may provide versatile options to accommodate the disclosed structure.

In some implementations, the protective cover can be used to protect the artwork from dust, dirt, and other damage. The protective cover may be made of a variety of materials, such as acrylic, polycarbonate, or glass, among others. In some implementations, the protective cover may be clear or tinted, depending on the desired effect. In some implementations, the protective cover can also be used to reduce the amount of UV light that reaches the artwork, which can help to prevent fading.

Figure 6:
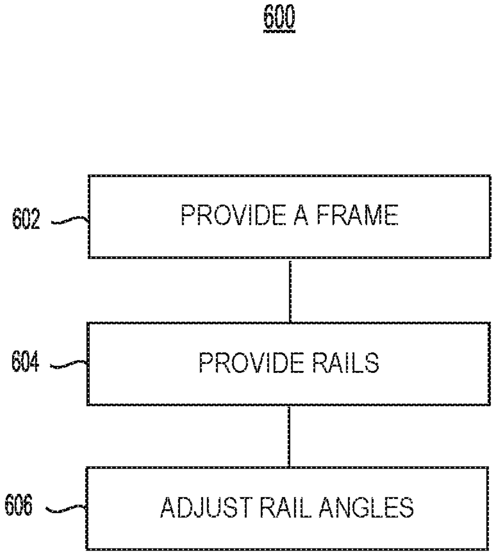
FIG. 6 depicts an example method of assembling an art display apparatus, according to an implementation.
Figure 7:
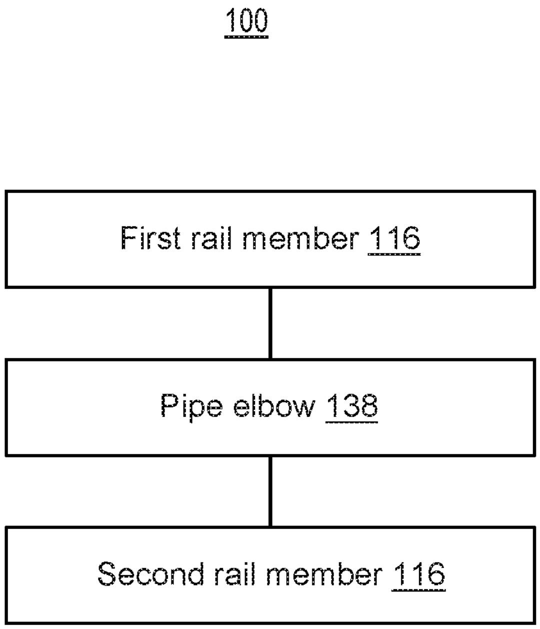

FIG. 6 depicts a method 600 of assembling an art display apparatus. The method 600 can be implemented using an apparatus 100 or any other features discussed in FIGS. 1-4. The method can include Acts 602-606. The Acts 602-606 can be executed in any order or sequence.

At 602, the method 600 can provide a frame. In an aspect, the method can include providing a frame having a base and a first panel coupled to the base. The base can include a first end, a second end, and a middle portion between the first end and the second end. The first end can define a plurality of holes. The base can further include a first side and a second side. In another aspect, the method can include providing that the first side is coupled to the first panel of the frame and that the second side is coupled to a second panel of the frame. In another aspect, the method can include providing that the first panel of the frame is coupled to a first side of the base via a hinge connection. The first panel of the frame can include two sets of elongated legs, where a first set of elongated legs can extend vertically and a second set of elongated legs can extend horizontally. In another aspect, the method can include providing at least two transverse crossbars, where a first transverse crossbar can connect the first set of elongated legs extending vertically and a second transverse crossbar can connect the second set of elongated legs extending horizontally. The at least two transverse crossbars can be positioned at midpoints of respective elongated legs. In another aspect, the method can include providing an actuator configured to direct movement of the first panel. In another aspect, the method can include providing a remote control operatively coupled to the actuator to provide, responsive to a command input, a control signal to the actuator to control operation of the actuator responsive to the control signal.

At 604, the method 600 can provide rails. In an aspect, the method can include providing a plurality of rails. Each rail of the plurality of rails can have a proximal end and a distal end. The proximal end can be received through one of the plurality of holes defined within the first end of the frame and can be pivotally coupled to the second end of the frame. In another aspect, the method can include providing each rail of the plurality of rails to be parallel to an axis traversing the middle portion of the base between the first end and the second end. In another aspect, the method can include providing a number of the plurality of rails proportional to a size of the frame.

At 606, the method 600 can adjust rail angles. Each rail of the plurality of rails can have an angle that can be configured to form a supporting structure to support an item of artwork. In aspect, the method can include providing each rail of the plurality of rails having the angle of 30 to 90 degrees at a distance from the distal end. In another aspect, the method can include providing a given rail of the plurality of rails including a first rail member and a second rail member coupled with the first rail member by a pipe elbow forming the angle. In another aspect, the method can include mounting one or more artworks to one or more rails, e.g., prior to or subsequent to adjustment of rail angles.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements are merely used to describe the orientation of various elements in the FIGURES. It should be noted that the orientation of various elements may differ according to other exemplary embodiments, and that such variations are intended to be encompassed by the present disclosure.

What is claimed is:

1. An art display apparatus for displaying artwork, the art display apparatus comprising:

a frame having a base and a first panel coupled to the base, the base comprising a first end, a second end, and a middle portion between the first end and the second end, the first end defining a plurality of holes; and a plurality of rails, each rail of the plurality of rails having a proximal end and a distal end, the proximal end received through one of the plurality of holes defined within the first end and pivotally coupled to the second end, wherein each rail of the plurality of rails has an angle to form a supporting structure to support an item of artwork.

2. The art display apparatus of claim 1, wherein the base further comprises a first side and a second side, the first side coupled to the first panel of the frame and the second side coupled to a second panel of the frame.

3. The art display apparatus of claim 1, wherein the first panel of the frame is coupled to a first side of the base via a hinge connection.

4. The art display apparatus of claim 1, wherein the first panel of the frame comprises:

two sets of elongated legs, a first set of elongated legs extending vertically and a second set of elongated legs extending horizontally; and at least two transverse crossbars, a first transverse crossbar connecting the first set of elongated legs extending vertically, and a second transverse crossbar connecting the second set of elongated legs extending horizontally, wherein the at least two transverse crossbars are positioned at midpoints of respective elongated legs.

5. The art display apparatus of claim 1, wherein each rail of the plurality of rails is parallel to an axis traversing the middle portion of the base between the first end and the second end.

6. The art display apparatus of claim 1, wherein a given rail of the plurality of rails comprises a first rail member and a second rail member coupled with the first rail member by a pipe elbow forming the angle.

7. The art display apparatus of claim 1, wherein each rail of the plurality of rails has the angle of 30 to 90 degrees at a distance from the distal end.

8. The art display apparatus of claim 1, wherein a number of the plurality of rails is proportional to a size of the frame.

9. The art display apparatus of claim 1, further comprising an actuator configured to direct movement of the first panel.

10. The art display apparatus of claim 9, further comprising a remote control operatively coupled to the actuator to provide, responsive to a command input, a control signal to the actuator to control operation of the actuator responsive to the control signal.

11. A method for assembling an art display apparatus, the method comprising:

providing a frame having a base and a first panel coupled to the base, the base comprising a first end, a second end, and a middle portion between the first end and the second end, the first end defining a plurality of holes; and providing a plurality of rails, each rail of the plurality of rails having a proximal end and a distal end, the proximal end received through one of the plurality of holes defined within the first end and pivotally coupled to the second end, wherein each rail of the plurality of rails has an angle to form a supporting structure to support an item of artwork.

12. The method of claim 11, wherein the base further comprises a first side and a second side, the method further comprising providing that the first side is coupled to the first panel of the frame and that the second side is coupled to a second panel of the frame.

13. The method of claim 11, further comprising providing that the first panel of the frame is coupled to a first side of the base via a hinge connection.

14. The method of claim 11, wherein the first panel of the frame comprises two sets of elongated legs, a first set of elongated legs extending vertically and a second set of elongated legs extending horizontally, the method further comprising:

providing at least two transverse crossbars, a first transverse crossbar connecting the first set of elongated legs extending vertically and a second transverse crossbar connecting the second set of elongated legs extending horizontally, wherein the at least two transverse crossbars are positioned at midpoints of respective elongated legs.

15. The method of claim 11, further comprising providing each rail of the plurality of rails to be parallel to an axis traversing the middle portion of the base between the first end and the second end.

16. The method of claim 11, further comprising providing a given rail of the plurality of rails comprising a first rail member and a second rail member coupled with the first rail member by a pipe elbow forming the angle.

17. The method of claim 11, further comprising providing each rail of the plurality of rails having the angle of 30 to 90 degrees at a distance from the distal end.

18. The method of claim 11, further comprising providing a number of the plurality of rails proportional to a size of the frame.

19. The method of claim 11, further comprising providing an actuator configured to direct movement of the first panel.

20. The method of claim 19, further comprising providing a remote control operatively coupled to the actuator to provide, responsive to a command input, a control signal to the actuator to control operation of the actuator responsive to the control signal.

* * * * *